Nov. 20, 1962      R. E. SMITH      3,064,813
METHOD AND MEANS FOR FILTRATION OF SLURRIES
Filed July 18, 1961
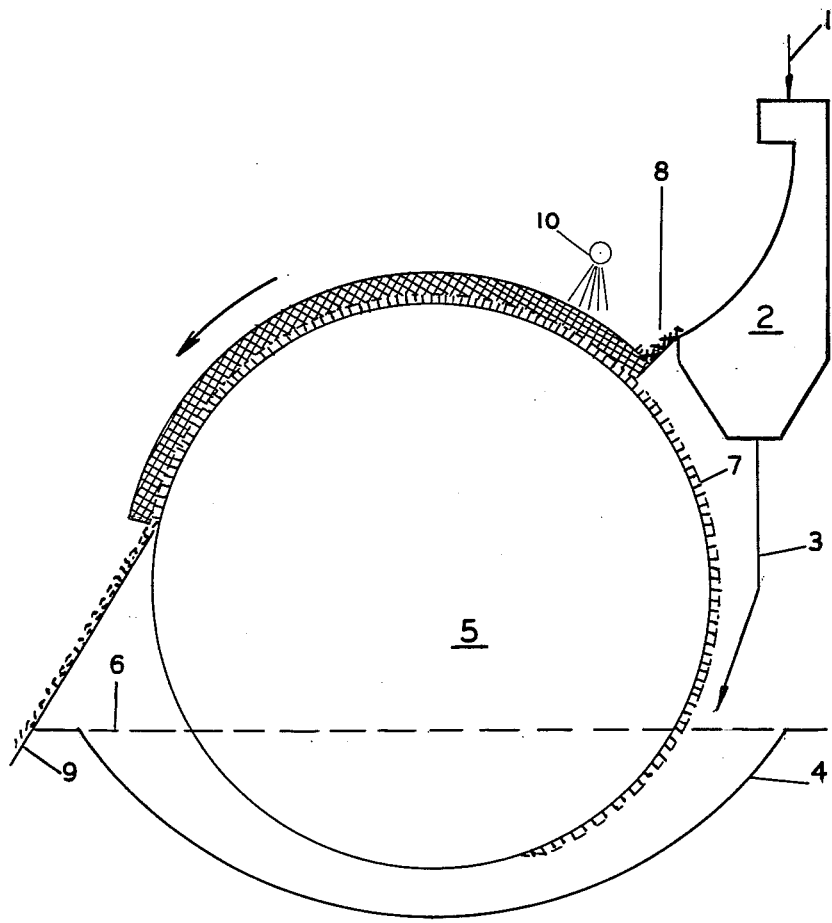
INVENTOR.
RANDAL E. SMITH
BY
*McGrew & Edwards*
ATTORNEYS

United States Patent Office 3,064,813
Patented Nov. 20, 1962

3,064,813
METHOD AND MEANS FOR FILTRATION
OF SLURRIES
Randal E. Smith, Carlsbad, N. Mex., assignor to Potash Company of America, Carlsbad, N. Mex., a corporation of Colorado
Filed July 18, 1961, Ser. No. 124,898
11 Claims. (Cl. 210—67)

This invention relates to methods and means for filtration of slurries of material in which the solids content is in a wide range of sizes.

In the usual ore beneficiation treatment having a filtration stage, it is common practice to thicken the pulp or slurry by removal of excess fluids so as to reduce the capacity requirement for handling the filtrate. Where rotary drum filters are used, if the solids content is very fine, it produces a viscous slurry and the solids will remain suspended in the filter vat or tank under minimum agitation, and form as a cake readily on the filter media of the rotary drum filter. As the quantity of fines lessens or there is an increase in coarser sizes, the coarser sizes tend to settle out and accumulate in the filter tank, overloading the agitation device with the result that substantially only fines are filtered and the operation eventually is shut down because of the overload effect.

Filters also are employed for washing of the cakes, and rotary drum filters are particularly suited for this purpose when the solids content of the slurry is in a fine size range. Top feed drum filters have been developed to handle coarse, clean slurries, which are fed at the top of the drum. These filters are not well suited to operations on slurries containing some slimes which "blind" the filtering media and require a screen wash and blow-back for continuous cleaning of the filter media. There is also a limit on the maximum size particle that can be retained on the top feed filter drum.

Because of the difficulty of filtering such coarse materials, other types of separators frequently are used for separation of solids from liquid. In general, all such devices are effective to a degree in removing moisture from coarse solids but each type has its shortcomings.

Centrifuges are frequently used for this purpose but are of relatively high cost and usually show high maintenance costs in addition. Drainage decks leave high moisture content and are unsatisfactory where a relatively dry product is required. Centrifuges vary considerably in design and washing of the cake frequently is very difficult. If the product is quite soluble in water, such as sylvite, requiring a brine of such material as a carrier medium, impurities tend to accumulate in the brine and it is quite important to remove this brine by washing. Consequently, the difficulty in washing the cake in a centrifuge may be one of the shortcomings of such equipment in circuits treating potash ores or the like.

The present invention provides a simple and effective arrangement for easy washing of a filter cake having a substantial fines and coarse content. It utilizes rotary drum filters, which may be washing type filters when required, and provides for a separation of the material to be treated into two fractions so as to take advantage of the characteristics of each. To this end, a slurry containing considerable coarse material and preferably thickened to form a high densitly slurry is first classified by screening or other separating means to remove most of the coarse sizes which would tend to settle in the filter tank. The undersize of screening constitutes the feed to the filter tank and forms a filter cake of the fines fraction in the usual manner, which cake acts as the filtering media for the coarse fraction removed as aforesaid and fed onto the cake media near the top of the drum on its elevating surface where it is retained by gravity through the dewatering cycle.

In such separation, the overflow product of screening is essentially dewatered and contains little liquid. Most of the liquid content of the feed to the screening stage passes with the fines fraction as feed to the filter vat. Thus, the slurry in the vat is in suitable condition for cake formation in the usual manner and the fine solids remain in suspension in the slurry under the agitation provided in the vat. The overflow product depositing onto the formed cake has sufficient travel on the drum before discharge to obtain the removal of its remaining moisture content and permit a substantial amount of washing.

Accordingly, it is an object of my invention to provide a simple, economical and efficient method of filtering or washing slurries having substantial amounts of solids in both fine and coarse sizes on rotary drum filters, and permits use of existing filter installations with only minor change in arrangement of equipment.

Another object of my invention is to provide a simple, durable and efficient rotary drum filter circuiting arrangement, requiring a minimum of operator control.

A further object of this invention is to provide a novel arrangement in a rotary drum filter circuit for simple, efficient and economical dewatering and washing of potash salts in coarse and fine sizes in a brine carrier.

A preferred arrangement for the practice of my invention is shown in the accompanying flow sheet drawing and the practice of the invention will be described with reference to said flow sheet. As shown, a slurry to be filtered comprises the feed 1 to sieve bend screen 2, the underflow 3 of which discharges, preferably by gravity, into the vat or tank 4 of a rotary drum-type filter 5 as the feed supply of a body of slurry 6 therein in which a lower segment of the filter drum is submerged. The suction pickup of drum 5 forms a cake 7 of solids in fine sizes which are elevated toward the sieve bend 2 by the rotation of the drum and the coarse or oversize product discharge 8 from the sieve deposits as a coarse solids cake on the previously formed cake 7. A scraper 9 discharges the filter cakes 7 and 8 before reentry of the filter surface into the body of slurry 6.

The arrangement shown provides for cake formation from the fines fraction in the body of slurry 6 by the usual action of the rotary drum filter, which may be of any commercial type. The sieve bend 2 is disposed at the elevating side of the drum near enough its top to insure gravitational retention of cake 8 on the preformed cake 7. This provides a travel on the order of 120° of the cycle of rotation providing an ample interval for moisture removal and washing. The discharge position of the sieve bend 2 in relation to the elevating drum surface spreads the discharging coarse solids 8 over the filter cake 7, the latter being essentially dry because of the relatively long travel from its emergence from the body of liquid 6.

This arrangement is particularly effective in washing of soluble materials such as potash salts. The industrial demand for such products is causing the producers to go to coarser sizes in the refining operation. A few years ago, a standard product would contain 80% of plus 100 mesh sizes which was somewhat coarse for satisfactory drum filtration. However, by utilizing improved methods of agitation and careful attention to pulp density, it was possible to use the drum filter for separation of the product from the brine. The present demand requires a coarser material containing at least 95% in the plus 65 mesh sizes and such material will not filter satisfactorily with conventional rotary drum filter operation. In processing sylvite ores, the sylvite is usually separated from the halite, which is a major constituent of the ore, by a froth flotation process. In such an operation, the ore is crushed to a size amenable to flotation separation and this separation can be carried out on relatively coarse material. Material as coarse as 6 mesh can be floated and by standard methods 10 mesh particles are easily floated. In preparing a flotation pulp, much of the ore will be in finer sizes and a broad range of particle size occurs in the final float concentrate.

By utilizing the practice of the present invention, it is possible to use conventional rotary drum filters on the coarse material with elimination of the need for new equipment and providing an effective washing of the filter cake on the drum. The sieve bend separates the coarse material from the fines as a substantially dewatered product and the fines are fed to the filter vat with most of the carrier brine. The provision of the separate cake formation utilizing the usual pickup action of the filter in the fine cake formation, substantially dewatering said cake and then depositing the dewatered coarse material for gravitational retention through a substantial arc of travel permits the whole cake to be washed effectively and separated as one product.

While the sieve bend is ideally suited to this size separation, other types of classification devices may be used. A vibrating screen will make the necessary separation and can be operated to discharge an essentially dry coarse product. A classifier such as a spiral or rake type also may be used and by provision of adequate raking action also will discharge an essentially dewatered coarse product. In each of such treatments, the coarse is discharged as a sandy material at high pulp density, while the fines are separated as a slurry of finer material at lower pulp density. Therefore, while the sieve bend is a preferred apparatus in the practice of the present invention, hydraulic classifiers or other mechanical classifiers may be used with effective results. In the accompanying flow sheet, a washing spray is shown at 10, but it will be understood that one or a plurality, usually several such sprays, will be disposed between the point of deposit of cake 8 and the scraper 9 to provide as much washing as is required in a given operation.

It will be apparent from the flow sheet disclosure and the accompanying description that the practice of the present invention may be easily incorporated in existing filter installations by inclusion of a minor amount of additional equipment and suitable piping adjustment. The main flows in and out of such circuit do not have to be altered except as to the point of feed introduction and the efficiency of the filtration resulting from the procedural changes usually will increase the capacity of the filtration stage in the circuit without increase in operational or maintenance expense.

Changes and modifications in the equipment arrangement and operation may be availed of within the spirit and scope of the invention as defined in the hereunto appended claims.

I claim:

1. In the art of filtering slurries having mixed coarse and fine solids in a carrier medium on a rotary drum vacuum filter having a lower portion of the drum submerged in a slurry-containing vat, the improvement which comprises classifying incoming feed to segregate a coarse fraction which is principally solids and a fine fraction including the greater portion of the carrier medium, introducing said fine fraction into the vat for forming a cake on the drum, discharging said coarse fraction onto the formed cake in its ascending movement toward the top of the drum thereby forming a coarse cake over the fine cake already formed, and subjecting the combined cakes to the filtering action of the drum during continuance of the rotary movement to a point of discharge on the descending side of the drum.

2. In the art of filtering slurries having mixed coarse and fine solids in a carrier medium on a rotary drum vacuum filter having a lower portion of the drum submerged in a slurry-containing vat, the improvement which comprises classifying incoming feed on a sieve bend screen to segregate a coarse fraction which is principally solids and a fine fraction including the greater portion of the carrier medium, introducing said fine fraction into the vat for forming a cake on the drum, discharging said coarse fraction onto the formed cake in its ascending movement toward the top of the drum thereby forming a coarse cake over the fine cake already formed, and subjecting the combined cakes to the filtering action of the drum during continuance of the rotary movement to a point of discharge on the descending side of the drum.

3. In the art of filtering slurries having mixed coarse and fine solids in a carrier medium on a rotary drum vacuum filter having a lower portion of the drum submerged in a slurry-containing vat, the improvement which comprises classifying incoming feed to segregate a coarse fraction which is principally solids and a fine fraction including the greater portion of the carrier medium, introducing said fine fraction into the vat for forming a cake on the drum, discharging said coarse fraction onto the formed cake in its ascending movement toward the top of the drum thereby forming a coarse cake over the fine cake already formed, and subjecting the combined cakes to the filtering action of the drum during substantially 120° of rotation.

4. In the art of filtering slurries having mixed coarse and fine solids in a carrier medium on a rotary drum vacuum filter having a lower portion of the drum submerged in a slurry-containing vat, the improvement which comprises classifying incoming feed to segregate a coarse fraction which is principally solids and a fine fraction including the greater portion of the carrier medium, introducing said fine fraction into the vat for forming a cake on the drum, discharging said coarse fraction onto the formed cake in its ascending movement toward the top of the drum thereby forming a coarse cake over the fine cake already formed, subjecting the combined cakes to the filtering action of the drum during continuance of the rotary movement to a point of discharge on the descending side of the drum, and washing said combined cakes while they are subjected to said filtering action.

5. In the art of filtering slurries having mixed coarse and fine solids in a carrier medium on a rotary drum vacuum filter having a lower portion of the drum submerged in a slurry-containing vat, the improvement which comprises classifying incoming feed to segregate a coarse fraction which is principally solids and a fine fraction including the greater portion of the carrier medium, introducing said fine fraction by gravity flow into the vat for forming a cake on the drum, discharging said coarse fraction onto the formed cake in its ascending movement toward the top of the drum thereby forming a coarse cake over the fine cake already formed, and subjecting the combined cakes to the filtering action of the drum during continuance of the rotary movement to a point of discharge on the descending side of the drum.

6. In the art of filtering slurries having mixed coarse and fine solids in a carrier medium on a rotary drum vacuum filter having a lower portion of the drum submerged in a slurry-containing vat, the improvement which comprises classifying incoming feed to segregate a coarse fraction which is principally solids and a fine fraction including the greater portion of the carrier medium, introducing said fine fraction into the vat for forming a cake on the drum, discharging said coarse fraction onto the formed cake in its ascending movement toward the top of the drum thereby forming a coarse cake over the fine cake already formed, subjecting the combined cakes to the filtering action of the drum during continuance of the rotary movement to a point of discharge on the descending side of the drum, and discharging the total material on the drum as one filter cake.

7. In the art of filtering sylvite slurries having coarse and fine sizes in a carrier brine on a rotary vacuum filter having a lower portion of the drum submerged in a slurry-containing vat, the improvement which comprises classifying incoming feed of such a slurry to segregate a coarse fraction which is principally solids, and a fine fraction including the greater portion of the carrier brine, introducing said fine fraction into the vat for forming a cake on the drum, discharging the coarse sylvite fraction onto the formed cake in its ascending movement toward the top of the drum thereby forming a coarse cake over the fine cake already formed, and subjecting the combined cakes to the filtering action of the drum during continuance of the rotary movement to a point of discharge on the descending side of the drum.

8. In the art of filtering sylvite slurries having coarse and fine sizes in a carrier brine on a rotary vacuum filter having a lower portion of the drum submerged in a slurry-containing vat, the improvement which comprises classifying incoming feed of such a slurry to segregate a coarse fraction which is principally solids, and a fine fraction including the greater portion of the carrier brine, introducing said fine fraction into the vat for forming a cake on the drum, discharging the coarse sylvite fraction onto the formed cake in its ascending movement toward the top of the drum thereby forming a coarse cake over the fine cake already formed, and subjecting the combined cakes to washing and the filtering action of the drum during continuance of the rotary movement to a point of discharge on the descending side of the drum.

9. In the art of filtering sylvite slurries having coarse and fine sizes in a carrier brine on a rotary vacuum filter having a lower portion of the drum submerged in a slurry-containing vat, the improvement which comprises classifying incoming feed of such a slurry to segregate a coarse fraction which is principally solids, and a fine fraction including the greater portion of the carrier brine, introducing said fine fraction into the vat for forming a cake on the drum, discharging the coarse sylvite fraction onto the formed cake in its ascending movement toward the top of the drum thereby forming a coarse cake over the fine cake already formed, subjecting the combined cakes to the filtering action of the drum during continuance of the rotary movement to a point of discharge on the descending side of the drum, and washing said combined cakes at a plurality of points while they are subjected to said filtering action.

10. The combination with a rotary drum filter having a lower portion of the drum submerged in a slurry-containing vat, of a sieve bend screen supported with its coarse product discharge directed for gravity feed onto preformed cake on an ascending surface of the drum adjacent its top, conduit means for discharging the fines product of the screen and carrier liquid as a slurry into said vat, and a scraper mounted for removal of the combined cake on the descending side of said drum.

11. The combination with a rotary drum filter having a lower portion of the drum submerged in a slurry-containing vat, of a sieve bend screen supported with its coarse product discharge directed for gravity feed onto pre-formed cake on an ascending surface of the drum adjacent its top, conduit means for discharging the fines product of the screen and carrier liquid as a slurry into said vat, a scraper mounted for removal of the combined cake on the descending side of said drum, and spray means for washing said combined cake between the coarse feed introduction and scraper discharge.

References Cited in the file of this patent

UNITED STATES PATENTS

| | | |
|---|---|---|
| 2,236,800 | Lissauer | Apr. 1, 1941 |
| 2,598,606 | Robison | May 27, 1952 |